(12) United States Patent
Verbil et al.

(10) Patent No.: US 7,231,031 B2
(45) Date of Patent: Jun. 12, 2007

(54) AIN CALL QUEUING

(75) Inventors: John M. Verbil, Scottsdale, AZ (US);
Martin R. Marks, Phoenix, AZ (US);
R. Eric Pflum, Phoenix, AZ (US);
William C. Catellier, Glendale, AZ (US); Roberto Yslas, Broomfield, CO (US)

(73) Assignee: Qwest Communications International Inc., Denver, CO (US)

( * ) Notice: Subject to any disclaimer, the term of this patent is extended or adjusted under 35 U.S.C. 154(b) by 1030 days.

(21) Appl. No.: 09/874,152

(22) Filed: Jun. 4, 2001

(65) Prior Publication Data

US 2001/0024495 A1    Sep. 27, 2001

Related U.S. Application Data

(63) Continuation-in-part of application No. 09/159,940, filed on Sep. 24, 1998, which is a continuation of application No. 08/806,973, filed on Feb. 26, 1997, now Pat. No. 5,844,896.

(51) Int. Cl.
*H04M 3/42* (2006.01)

(52) U.S. Cl. .............................. 379/215.01; 379/211.02; 379/221.08; 379/221.11; 379/209.01

(58) Field of Classification Search ........... 379/211.02, 379/221.08, 221.11, 209.01
See application file for complete search history.

(56) References Cited

U.S. PATENT DOCUMENTS

| | | | | |
|---|---|---|---|---|
| 5,208,848 A | * | 5/1993 | Pula | 379/88.01 |
| 5,271,058 A | * | 12/1993 | Andrews et al. | 379/265.11 |
| 5,440,623 A | | 8/1995 | Moore et al. | |
| 5,600,710 A | * | 2/1997 | Weisser et al. | 379/88.19 |
| 5,610,912 A | | 3/1997 | Johnston | |
| 5,633,924 A | | 5/1997 | Kaish et al. | |
| 5,652,790 A | | 7/1997 | Andruska et al. | |
| 5,668,861 A | * | 9/1997 | Watts | 379/215.01 |
| 5,692,033 A | * | 11/1997 | Farris | 379/67.1 |
| 5,696,809 A | | 12/1997 | Voit | |
| 5,701,301 A | | 12/1997 | Weisser, Jr. | |
| 5,754,634 A | | 5/1998 | Kay et al. | |
| 5,799,073 A | | 8/1998 | Fleischer, III | |
| 5,844,896 A | * | 12/1998 | Marks et al. | 370/385 |
| 6,445,782 B1 | * | 9/2002 | Elfe et al. | 379/201.01 |
| 6,597,780 B1 | * | 7/2003 | Knoerle et al. | 379/211.01 |

* cited by examiner

Primary Examiner—Rasha S. AL-Aubaidi
(74) Attorney, Agent, or Firm—Brooks Kushman P.C.

(57) ABSTRACT

An inexpensive alternative for call queuing is provided by queuing calls at an intelligent peripheral within an AIN telecommunication system. A call to the subscriber line is detected at a local switch supporting the subscriber line. If the subscriber line is busy, the call to the subscriber is queued in the intelligent peripheral.

26 Claims, 11 Drawing Sheets

AIN CALL QUEUING

CROSS-REFERENCE TO RELATED APPLICATIONS

This application is a continuation-in-part of U.S. application Ser. No. 09/159,940, filed Sep. 24, 1998, which, in turn, is a continuation of Ser. No. 8/806,973 now U.S. Pat. No. 5,844,896, filed Feb. 26, 1997, each of which is incorporated by reference herein.

BACKGROUND OF THE INVENTION

1. Field of the Invention

This invention relates to telecommunications network-based call queuing operations.

2. Background Art

For businesses that receive many phone calls per day, it is common for a telephone company to provide such subscribers with more than a single incoming telephone line on which to receive calls. These multiple lines are commonly configured as a hunt group. The hunt group has a telephone number associated with it which, when dialed, causes a telephone routing system to attempt to connect the call to each of the incoming telephone lines until an idle line is found.

Many businesses also subscribe to voice messaging or queuing services provided by their telephone company. In such systems, if all the telephone lines in the hunt group are busy or go unanswered, the voice messaging system (VMS) generates a computer-activated message instructing the caller to leave a message. The message is then recorded by the voice messaging system and is stored in a computer, thereby allowing subscribers to listen to the recorded messages and call back the customers who were unable to get through. With queuing services, if all the telephone lines in the hunt group are busy, a computer-activated message is similarly generated instructing the caller that all operators are currently busy, and that the call will be answered in the order received.

While the above call handling features have worked well for the majority of call handling situations, they have their drawbacks. Namely, neither feature allows a caller to choose whether to leave a message or to remain on the line while a call is answered. One solution overcomes this problem through use of a switch-based approach. For example, programmable central office switches may provide prioritized features to a telephone number including queuing, Call Forward Don't Answer to the voice messaging system, and Call Forward Busy Line to the voice messaging system. The routing system typically includes a set of incoming telephone lines that are configured as a multi-line hunt group having a Hunt Group Directory Number associated with it. The Hunt Group Directory Number has queuing, Call Forward Line to the VMS and Call Forward Don't Answer to the VMS features enabled. The multi-line hunt group has further associated with it a set of individual hunt group telephone numbers that are matched to each of the incoming telephone lines. Each individual hunt group telephone number has the features Call Forward Busy Line to the VMS and Call Forward Don't Answer to the VMS enabled, but does not have a queuing feature enabled.

While a switch-based approach combines queuing and voice messaging features with existing telephone switching and voice messaging hardware, it does so at a cost which has limited its use to larger business customers. Moreover, because the approach is switch based, it is inapplicable to next generation network system, namely an Advanced Intelligent Network (AIN).

Consequently, a need exists for a cost-effective system and method which permits residential customers and small to medium sized business customers the ability to place incoming calls in a queue when all of their lines are busy for later retrieval. Such a system and method should obviate the need for a subscriber to purchase telephone lines equivalent to the maximum queue size as well as the hardware needed to provide such queuing function. Subscribers should not be required to purchase any additional telephone lines or hardware to provide the required queuing function. Also, telecommunications providers should not be required to purchase additional, expensive network components to support queuing services since the cost of these components will likely be factored into service charges.

Queuing services should make available a variety of features. Queues should be managed so as to permit status of queued calls to be forwarded to the subscriber. Queues should be managed so as not to permit callers to remain in network-based queues. This may happen, for example, if a caller forgets that a queued call is on hold or on speaker. Further, queues should be managed so as to provide subscribers with information about how queues are being utilized.

SUMMARY OF THE INVENTION

The present invention provides an inexpensive alternative for call queuing by queuing calls at an intelligent peripheral within an Advanced Intelligent Network (AIN) telecommunication system.

A method of queuing calls to a subscriber of queuing services accessed through a subscriber line is provided. A call to the subscriber line is detected at a local switch connected to the subscriber line. If the subscriber line is busy, the call to the subscriber is queued in a intelligent peripheral within the telecommunications system. If a call is queued in the intelligent peripheral and the subscriber line is determined to be not busy, the call to the subscriber is connected to the subscriber line.

In an embodiment of the present invention, detecting the call to the subscriber includes setting a Termination Attempt Trigger against the subscriber line. Alternatively, detecting the call to the subscriber includes provisioning Call Forward on Busy Line on the subscriber line.

In another embodiment of the present invention, queuing the call to the subscriber includes forwarding the subscriber line call to a Direct Inward Dial telephone number on the intelligent peripheral.

In still another embodiment of the present invention, determining that the subscriber line is not busy includes setting a Next Event List at the subscriber local switch. Alternatively, determining that the subscriber line is not busy includes provisioning Call Forward on Busy Line on the subscriber line causing the local switch to call the Intelligent Peripheral when the subscriber line is found to be busy. Thereafter, the subscriber line is dialed from the intelligent peripheral. The subscriber line is determined to be busy if the local switch calls the intelligent peripheral in response to the call to the subscriber line from the intelligent peripheral.

In yet another embodiment of the present invention, the method further includes determining that the call to the subscriber has been queued for a determined amount of time. The caller placing the call to the subscriber is requested to perform an action to remain in queue. If the caller does not perform the requested action, the call is dequeued.

In a further embodiment of the present invention, the method includes receiving a plurality of calls to access the subscriber line. Each received call is placed in the queue associated with the subscriber line if the subscriber line is busy. Queue utilization information is collected about each queued call. Queue utilization statistics are generated based on the collected queue utilization information.

In a still further embodiment of the present invention, the method includes placing a call from the intelligent peripheral indicating status of the queued subscriber line call to the subscriber.

In yet a further embodiment of the present invention, the intelligent peripheral may be switchless.

A system for queuing subscriber calls is also provided. Each subscriber call is placed by a caller to a subscriber line. The system includes a local switch servicing the subscriber line. The local switch includes Call Forward on Busy Line functionality provisioned on the subscriber line. The Call Forward on Busy Line functionality forwards any subscriber call received for the subscriber line when the subscriber line is busy. The system also includes an intelligent peripheral within the AIN system. The intelligent peripheral receives a forwarded subscriber call from the local switch. If queue slots are available in the intelligent peripheral, the received subscriber call is queued. A busy check call is placed from the intelligent peripheral to the subscriber line. The busy check call is dropped if the busy check call is forwarded back to the intelligent peripheral from the local switch. A queued subscriber call is connected to the busy check call if the subscriber line is not busy.

In an embodiment of the present invention, the system further includes a service control point determining if queue slots are available in the intelligent peripheral. If the system further comprises a messaging system, the control point instructs the intelligent peripheral to dial the number of the messaging system and to bridge the received subscriber call to the messaging system call if the service control point determines no queue slots are available. The service control point may also instruct the intelligent peripheral to play a message to the received subscriber call if the service control point determines no queue slots are available.

A method for queuing subscriber calls is also provided. A subscriber line is provisioned with Call Forward on Busy Line functionality at a local switch servicing the subscriber line. A subscriber call destined for the subscriber line is received at the local switch. If the subscriber line is busy, the received call is forwarded to a Direct Inward Dial telephone number on an intelligent peripheral via the Call Forward on Busy Line functionality. The forwarded call is received at the intelligent peripheral and queued if the intelligent peripheral has at least one available queue slot.

A method for queuing subscriber calls is also provided. At least one subscriber call is queued in an intelligent peripheral. A busy check call is placed from the intelligent peripheral to a subscriber line. The busy check call is received in a local switch servicing the subscriber line. If the subscriber line is busy, the busy check call is forwarded back to the intelligent peripheral through Call Forward on Busy Line functionality implemented in the local switch. The busy check call is disconnected if the intelligent peripheral receives back the forwarded busy check call. A queued subscriber call is connected with the busy check call if the subscriber line is not busy.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
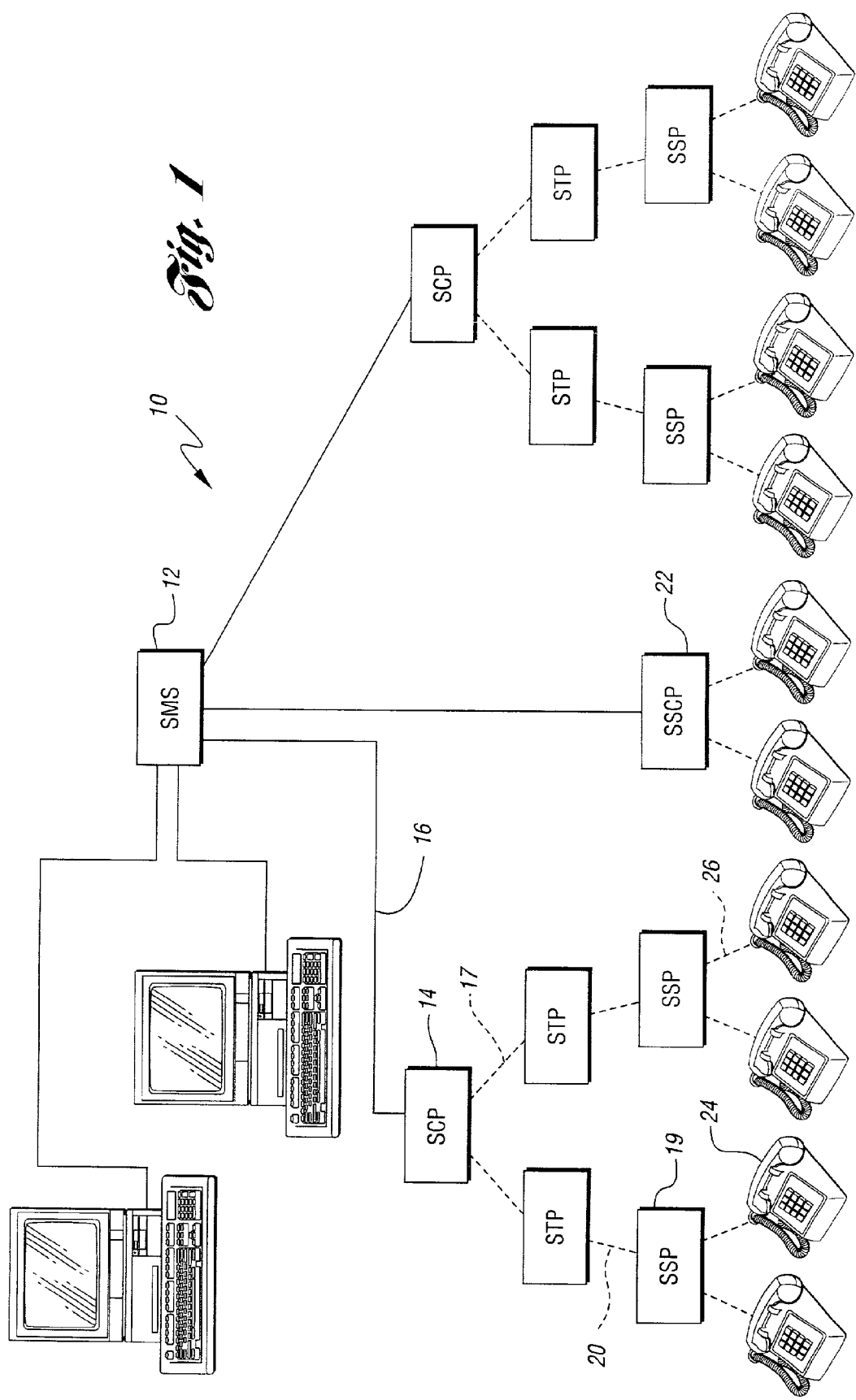
FIG. 1 is a block diagram of a representative Advanced Intelligent Network (AIN)

With reference to FIG. 1 of the drawings, a schematic diagram of a representative Advanced Intelligent Network (AIN) architecture is disclosed for use in a Public Switched Telephone Network (PSTN). The AIN architecture referred to is designated generally by reference numeral 10. As those skilled in the art will recognize, network architecture 10 is implemented with common channel Signaling System No. 7 (SS7) protocol. SS7 generally operates at 56 kbps and can support variable message lengths up to 2,176 bits (272 octets) of information per message.

As is known in the art, the SS7 network may be comprised of various package switching elements and transmission links, some of which are shown. As seen, there is also provided service management system (SMS) 12 which generally comprises a computer-based system used to design service logic, to control logic implementation to the network, and to manage the network operation, such as monitoring traffic levels and collecting statistics and billing data. SMS 12 is provided in electrical communication with a plurality of service control points (SCPs)/adjuncts 14 via wide area network management links 16. Again, as those skilled in the art will recognize, AIN service control points 14 are nodes which contain the service logic and associated data support to execute the required customer services.

Still further, there is provided signal transfer points (STPs) 18 in electrical communication with SCP/adjunct 14 via signaling links 17. Service transfer points 18 are packet switches used to route signaling messages within the network. Service switching points (SSPs) 19 are also provided. Service switching points 19 are generally nodes, usually the subscriber local switch or central office switch, which recognize the triggers generated when a subscriber's service invokes an intelligent network trigger and then communicates with the SCP to operate the service.

As shown, service switching points 19 are provided in electrical communication with signal transfer points 18 via signaling links 20. In limited traffic situations, service switching and control points (SSCPs) 22 may also be provided for combining the functions of the SCP and SSP. Subscribers 24 have at least one customer premises equipment (CPE) device such as a telephone, facsimile machine, voice messaging peripheral, modem, or the like. As shown, CPE devices 24 are provided in electrical communication with service switching points 19 (COS) via telephone lines 26.

The AIN architecture referred to above is known to permit services to be extended throughout the network. In operation, new services are typically installed on two SCP processing platforms for directly servicing a selected market. In operation, this service management system extends management and control to the remote service control points/adjuncts via a signaling network.

Figure 2:
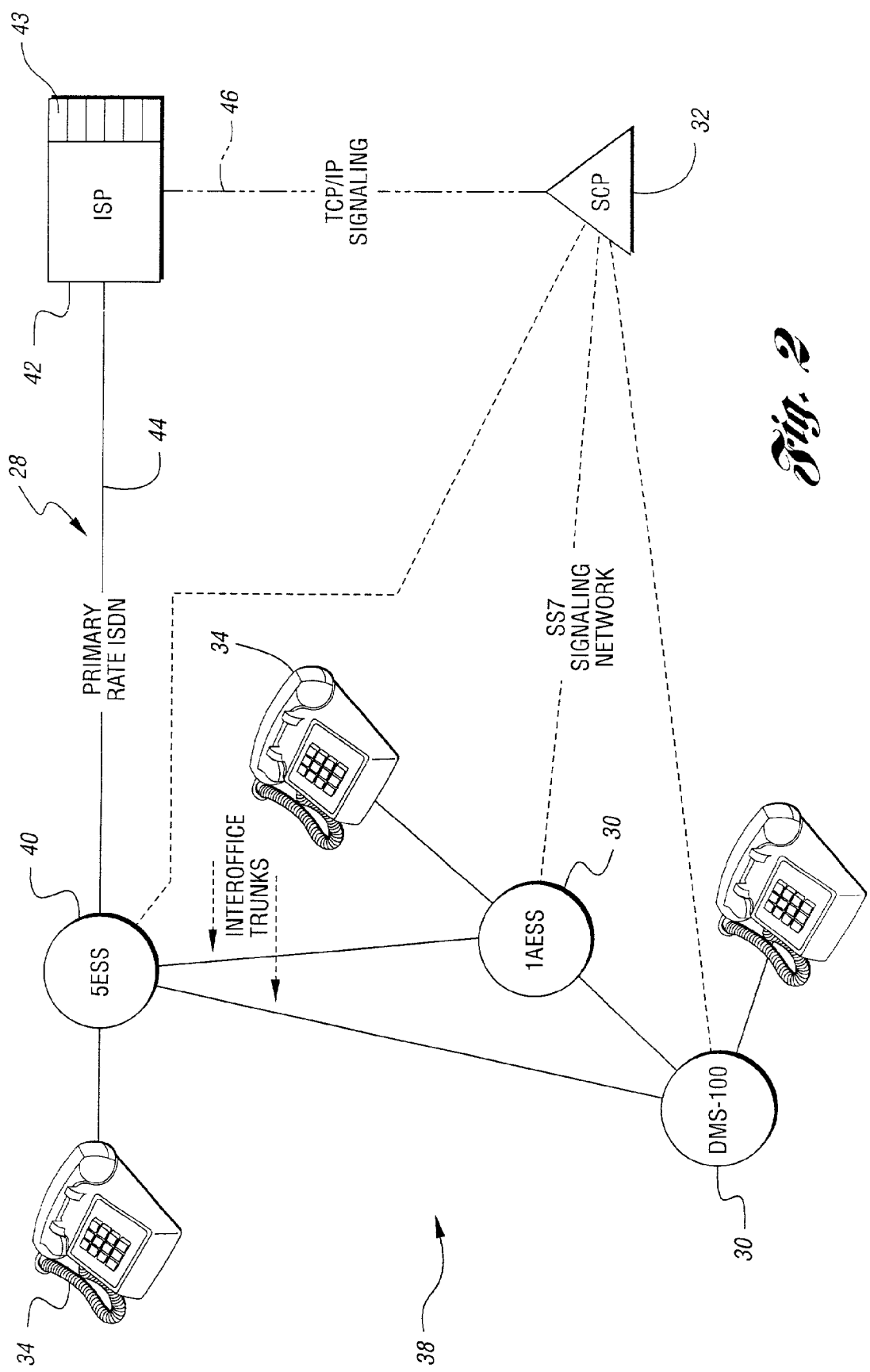
FIG. 2 is a block diagram of a telephone routing and queuing system operative to carry out the method of the present invention.

Turning now to FIG. 2, there is shown a schematic diagram of a system used to implement the method of the present invention. The system, which is designated generally by reference numeral 28, includes at least one subscriber switch 30 which is provided in electrical communication with at least one service control point 32 and at least one, preferably a plurality, of subscribers 34 so as to define an Advanced Intelligent Network 38. The Advanced Intelligent Network is equipped with Termination Attempt Trigger (TAT) and terminating Next Event List (NEL) functionality, the operation of which is well known to those skilled in the art and therefore need not be discussed here in further detail. The TAT is set against the subscriber's line in terminating switch 30. Call processing in switch 30 is configured to detect the TAT. Upon detection of a TAT, a query is launched to SCP 32.

One of the switches 40 in system 28 may be designated as a host central office switch by virtue of the fact that it is provided in electrical communication with an intelligent peripheral (IP) 42 implementing one or more queues 43. The intelligent peripheral 42 is preferably, but not necessarily, a Bellcore Intelligent Services Peripheral which is provided in electrical communication with the host central office switch 40 via Primary Rate Integrated Services Digital Network (ISDN) links 44 and further provided in electrical communication with SCP 32 via TCP/IP (wide area network) signaling 46. Thus, IP 42 need not contain any switching elements for call routing. In further keeping with the invention, each of the subscribers 34 maintains a dedicated and preferably, but not necessarily, subscriber programmable number of queuing slots within intelligent peripheral 42.

As discussed above, the method may be implemented in an Advanced Intelligent Network, such as that illustrated in system 28 of FIG. 2, which is equipped with TAT and NEL functionality. Queuing system 28 includes intelligent processor 42 equipped with queuing functionality to provide a platform for the present invention.

Referring to FIGS. 3, 4, 6, 7, 9 and 10, flow diagrams illustrating embodiments of the present invention are shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form for ease of illustration.

Figure 3:
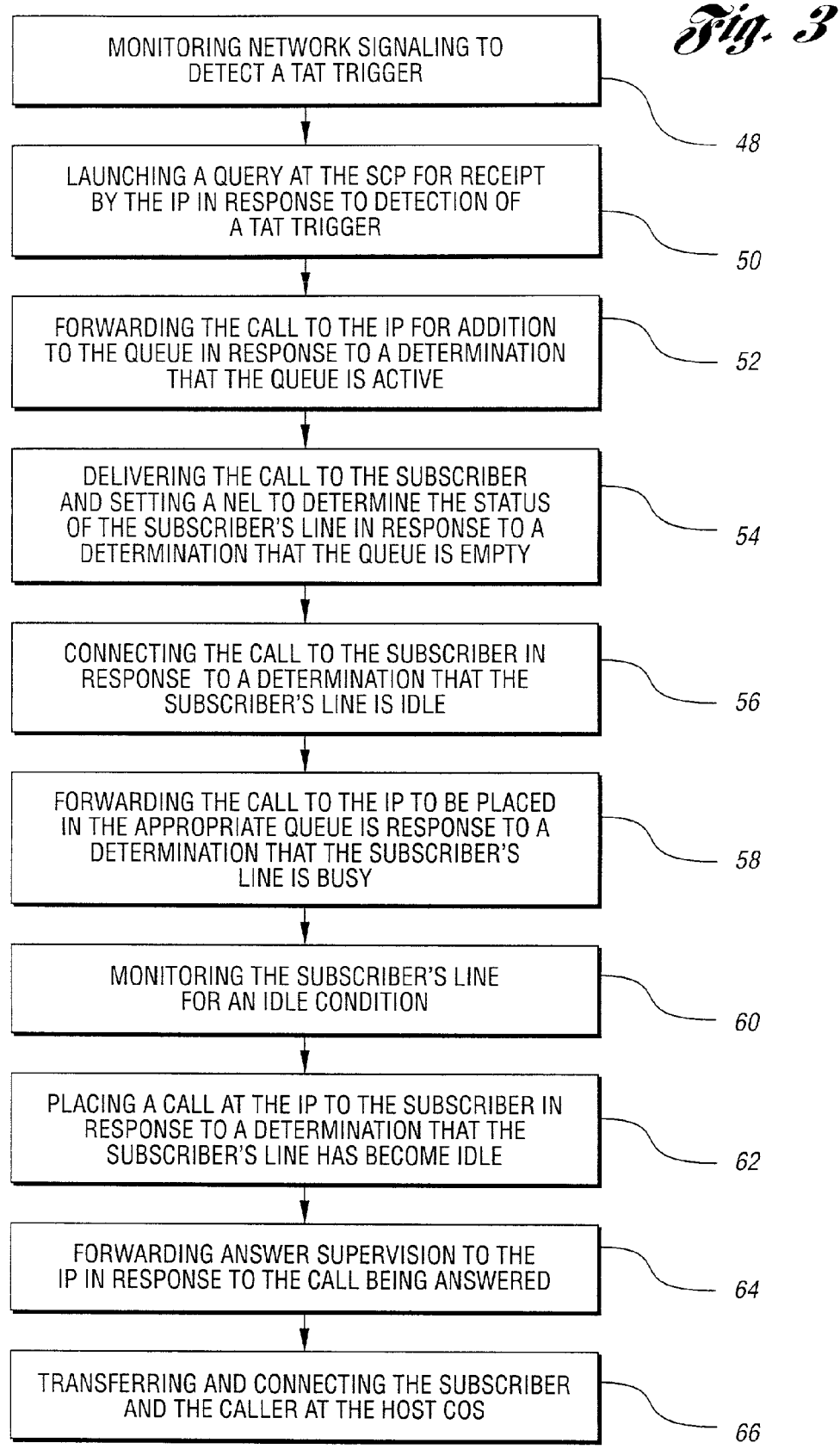
FIG. 3 is a flow diagram illustrating the method steps of queuing and connecting a caller and a subscriber according to an embodiment of the present invention.

Referring now to FIG. 3, a flow diagram illustrating the method steps of queuing and connecting a caller and a subscriber according to an embodiment of the present invention is shown. In operation, network signaling is monitored 48 for detection of a TAT. Upon detection of a TAT, a query is launched 50 at the SCP. The query is launched in response to the detected TAT and is operative to request the queue status of the subscriber line. If, in response to the SCP query, the queue is determined to be active, the call is forwarded 52 to the IP for addition to the queue. In contrast, if the queue is determined to be empty, the call is delivered 54 to the subscriber and a NEL is set to determine the status of the subscriber line. Of course, if the subscriber line is idle, the call will be connected 56 to the subscriber. Alternatively, if it is determined that the subscriber line is busy, the call will be forwarded 58 to the IP to be placed in the appropriate queue.

The subscriber line is thereafter monitored for an idle condition. If an idle condition is detected, a call is placed from the IP to the subscriber. Upon being answered, answer supervision is forwarded to the IP whereupon the subscriber is connected to the IP and an announcement is played telling the subscriber the number of calls currently stacked (waiting) in queue. The call is then transferred at the host COS where the caller and subscriber are connected.

Figure 4:
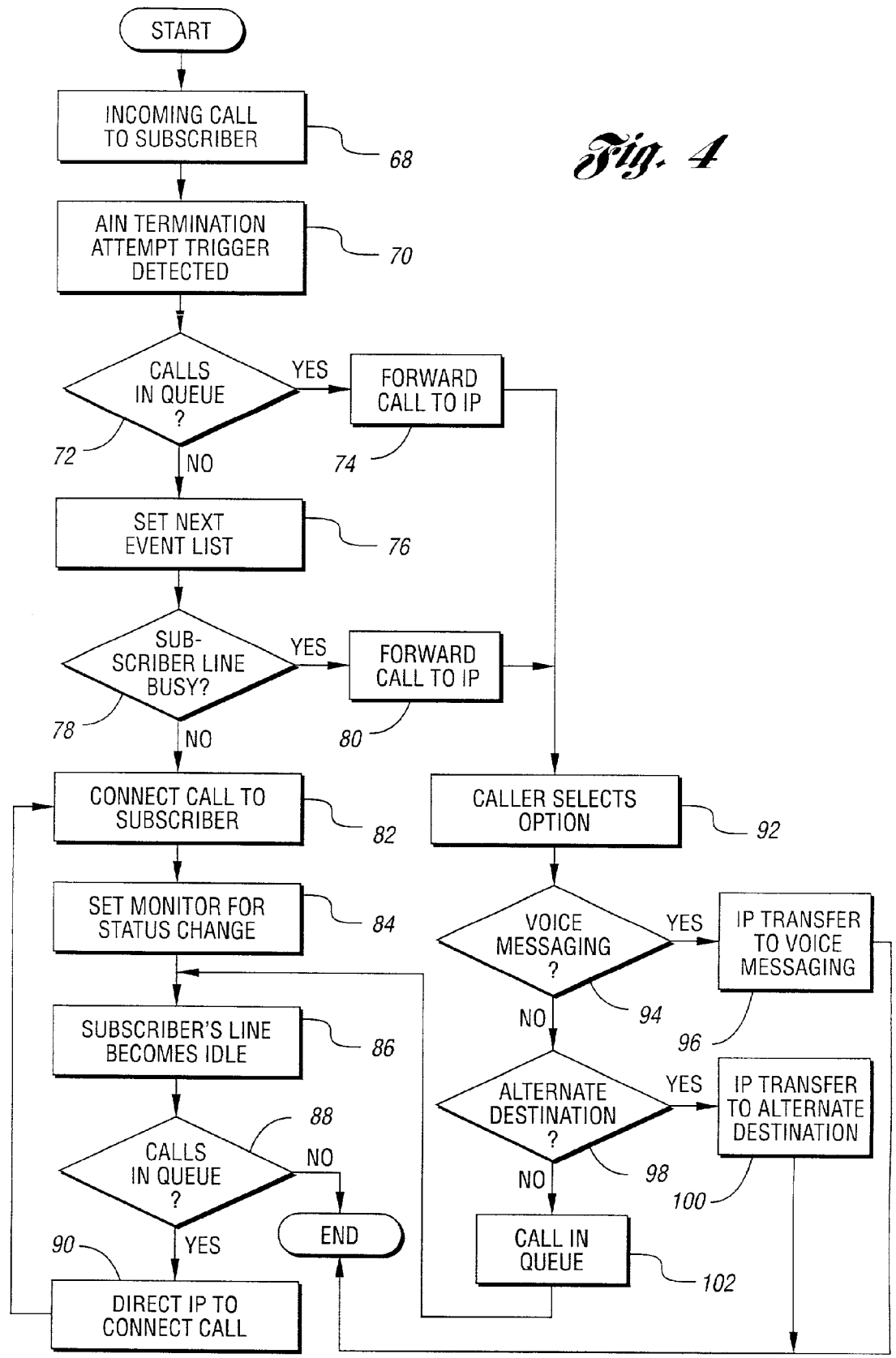
FIG. 4 is a detailed flow diagram illustrating a method for queuing and servicing calls to a subscriber line according to an embodiment of the present invention.

The above described method may be further understood by reference to the detailed flow diagram of FIG. 4. As shown in block 68, the network attempts to deliver a call to the subscriber. As part of call processing, the network encounters a TAT, as shown in block 70. A check is made at block 72 to determine if the subscriber already has other calls in queue. If there are calls already in queue, the network is directed to forward this call to the IP for further processing, as shown in block 74. If there are no calls in queue, the network is directed to set the Next Event List, as shown in block 76, and attempt to connect to the subscriber line.

If the subscriber line is busy, as shown in block 78, the next event list processing directs the network to forward the call to the IP, as shown in block 80. If the subscriber line is not busy, the network will connect the call to the subscriber, as shown in block 82, and set a monitor on the subscriber line to report when it is idle, as shown in block 84. When the call is completed and the subscriber line becomes idle, as shown in block 86, the network checks to see if there are any calls left in queue, as shown in block 88. If there are no calls in queue for the subscriber, this process ends. If there are other calls in queue, the IP is directed to deliver the call from the queue to the subscriber, as shown in block 90. The process continues from block 82 and repeats as previously described.

Calls that are forwarded to the IP as shown in blocks 74 and 80 are connected and the caller is given a choice of treatments, as shown in block 92. If the caller elects to leave a message, as shown in block 94, the IP forwards the call to a messaging system, as shown in block 96. If the caller elects an alternate destination, as shown in block 98, then the IP forwards the call to that telephone line, as shown in block 100. The caller then can elect to disconnect or to be placed in queue and hold waiting for the subscriber line to become idle, as shown in block 102. Once the subscriber line becomes idle, the process continues from block 86 as previously described.

Thereafter, answer supervision is forwarded to the IP, the subscriber is connected to the IP and an announcement is played telling the subscriber the number of calls currently stacked (waiting in queue). The call is then transferred at the host COS where the caller and subscriber are connected.

Various enhancements and modifications of the above-described method are, of course, contemplated. For example, when a caller attempts to call a subscriber and all lines are busy, the IP may be programmed to state a listed directory name, if recorded, and/or an announcement indicating that all lines are busy. The caller may then be placed into queue and allowed to exit by pressing a designated number such as, for example, "1" on the caller touch tone phone to leave a message, if the subscriber has a messaging number associated with their service. As part of the invention, the IP will then attempt to complete the call and, if successful, the service will end the query and allow the caller and subscriber to maintain their voice connection until terminated by one of the parties.

In the event that the lines are still busy, the caller will remain in queue at the IP. Announcements may, of course, be placed to the caller, indicating that the lines are still busy. The caller will then be provided with the option to exit and leave a message, if the subscriber has a messaging number. Additional calls that are routed to the IP on a busy condition will be placed in order behind existing calls in queue. If a subscriber has a messaging number and the caller presses "1", for example, on a touch tone phone, the caller will be transferred directly to the subscriber messaging service. Once the caller is transferred to the voice messaging system, the call is complete and the IP will allow the caller to remain connected until the call is terminated by the caller or the messaging system or service. The caller can, of course, hang up on the telephone at any time to disconnect the call.

Other anticipated enhancements include subscriber controlled queue slot sizing, music on hold, subscriber recorded announcements, priority queuing, MIS reports which provide the subscriber an indication of how many calls are on hold and how long they are waiting by hour, as well as an indicator tone or visual indication which will alert the subscriber that there are calls holding at the IP.

Figure 5:
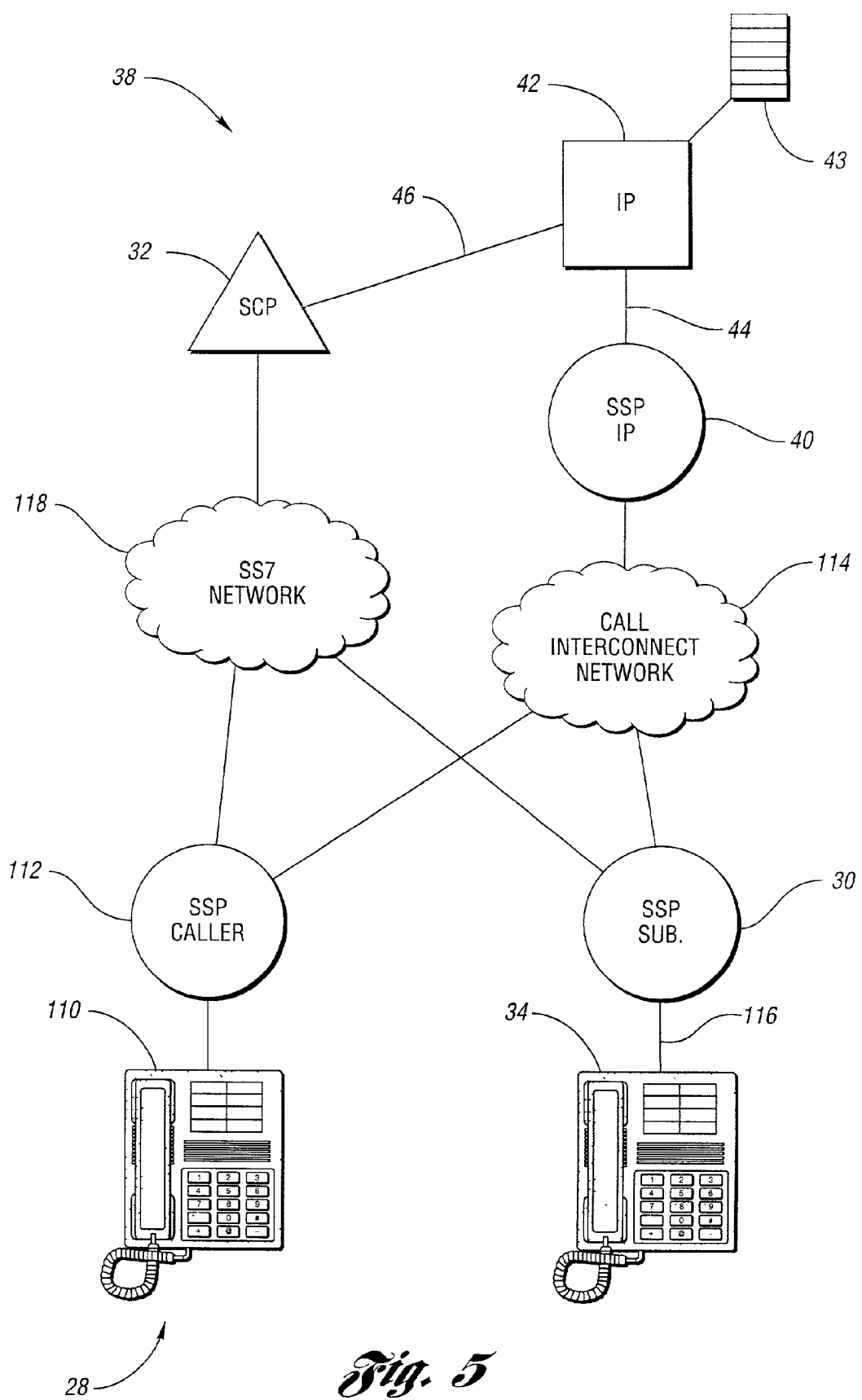
FIG. 5 is a block diagram of a call queuing system according to an embodiment of the present invention.

Referring now to FIG. 5, a block diagram of a call queuing system according to an embodiment of the present invention is shown. A caller, indicated by CPE device 110, accesses queuing system 28 through caller SSP 112. Caller SSP 112 is linked to other central office switches through call interconnect network 114. Subscriber 34 receives calls placed by caller 110 through local subscriber SSP 30. Intelligent peripheral 42 queues calls placed by callers 110 when subscriber lines 116 are busy or otherwise unavailable. SCP 32 communicates with switching elements in queuing system 28 through SS7 network 118.

Local switch 30 serving subscriber line 116 includes Call Forward on Busy Line functionality provisioned on subscriber line 116. The Call Forward on Busy Line functionality forwards any subscriber call received for subscriber line 116 when subscriber line 116 is busy. Intelligent peripheral 42 receives any forwarded subscriber call from local switch 30. If queue slots 43 are available in intelligent peripheral 42, the received subscriber call is queued. Intelligent peripheral 42 places a busy check call to subscriber line 116. The busy check call is dropped if the busy check call is forwarded back to intelligent peripheral 42 from local switch 30. A subscriber call held in queue 43 is connected to the busy check call if subscriber line 116 is not busy.

Figure 6:
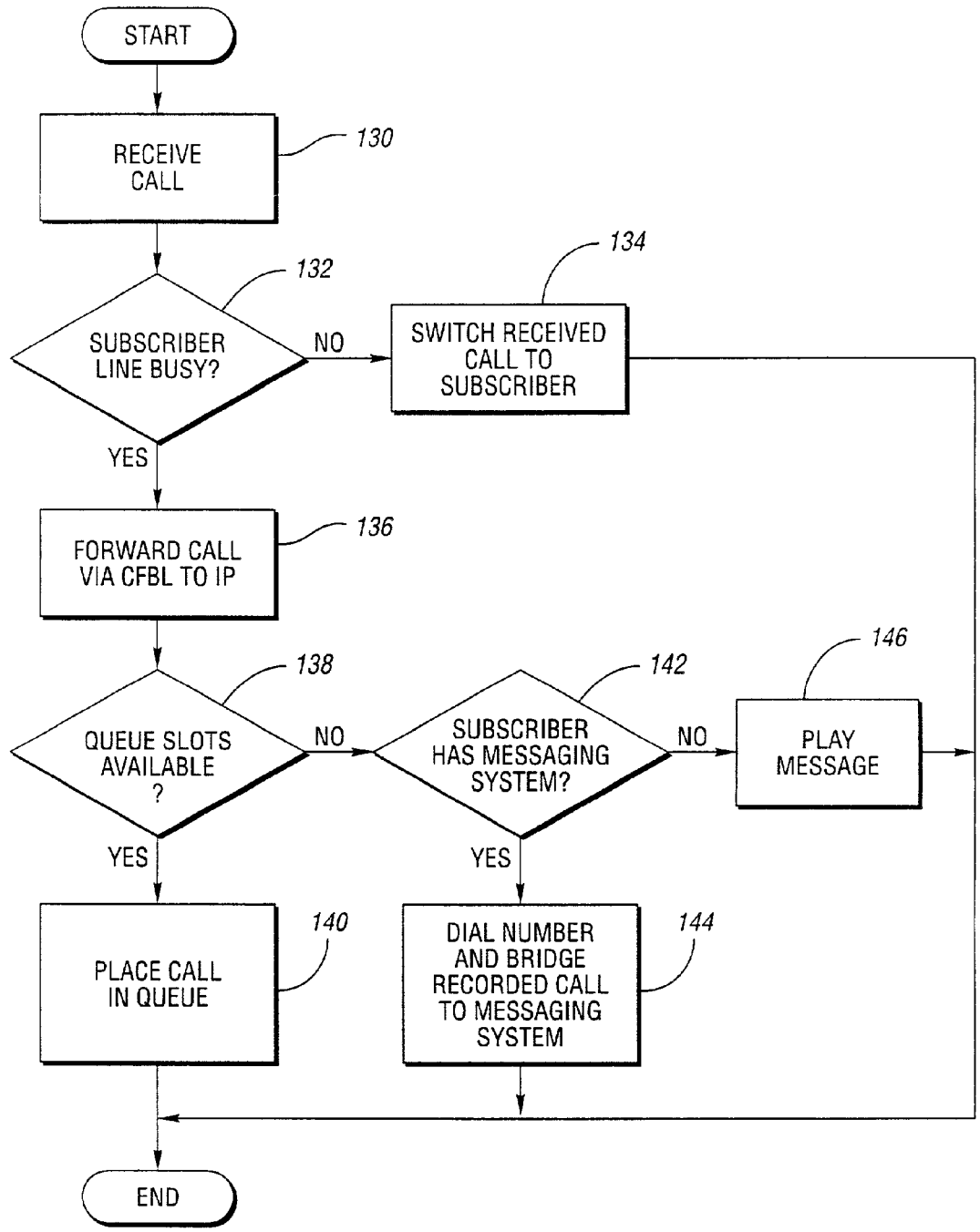
FIG. 6 is a flow diagram of a call queuing according to an embodiment of the present invention.

Referring now to FIG. 6, a flow diagram of call queuing according to an embodiment of the present invention is shown. A call is received at switch 30 supporting subscriber line 116, as in block 130. A check is made within switch 30 to determine if subscriber line 116 is busy, as in block 132. If subscriber line 116 is not busy, the received call is connected to subscriber line 116, as in block 134.

If subscriber line 116 is busy, the received call is forwarded to IP 42, as in block 136. The Call Forward on Busy Line feature provisioned on subscriber line 116 forwards the received call to a Direct Inward Dial telephone number on AIN IP 42. When IP 42 receives the subscriber call, IP 42 establishes communication with SCP 32 via an SR-3511 interface using TCP/IP. IP 42 requests instructions for handling the call from SCP 32.

A check is made to determine if queue slots 43 are available as in block 138. SCP 32 looks up subscriber information in an associated database and, if queue slots 43 are available, responds to IP 42 with instructions to play an announcement to caller 110 stating that all lines are busy and to please hold. IP 42 may also play a message to caller 110 providing caller 110 with the option to leave a message if the system is so provisioned. The received subscriber call is placed in queue 43, as in block 140.

If no slots in queue 43 are available, a check is made to determine if subscriber 34 has a messaging system, as in block 142. If subscriber 34 has a messaging system, SCP 32 instructs IP 42 to dial the appropriate messaging number. IP 42 then bridges the two legs of the call at IP host switch 40 and drops the IP links in the call, including the SR-3511 link to SCP 32. Thus, calling party 110 is completely unaware of having passed through a queuing system to reach the messaging system. The messaging system may be within subscriber 34 or may be supported by other network components within queuing system 28.

If subscriber 34 does not have a messaging system, SCP 32 instructs IP 42 to play a message, as in block 146. IP 42 plays a message to caller 110 announcing that all lines are busy and to please try the call again later. IP 42 then disconnects the subscriber call and closes the SR-3511 link with SCP 32.

Figure 7:
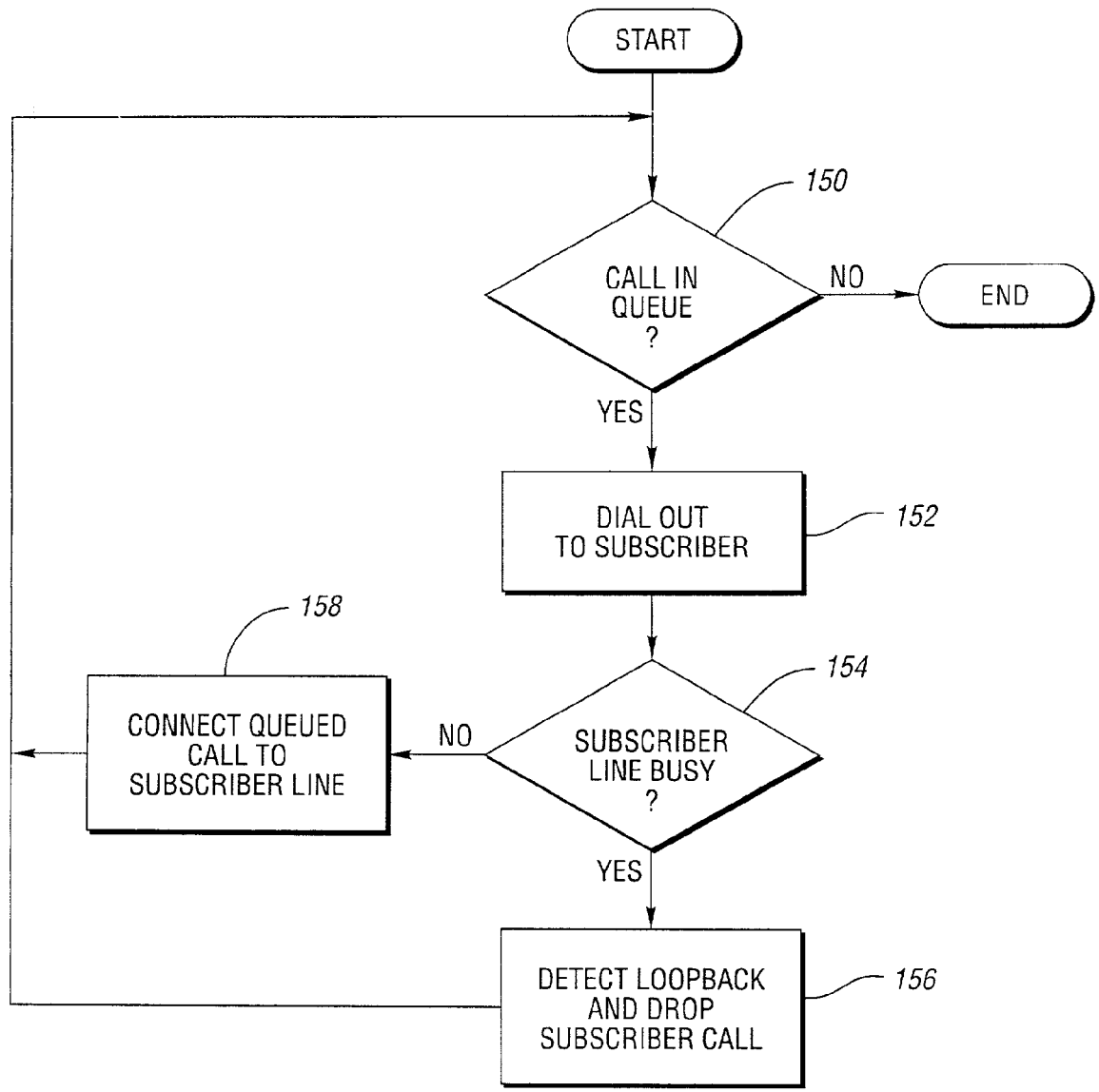
FIG. 7 is a flow diagram of call dequeuing according to an embodiment of the present invention.

Referring now to FIG. 7, a flow diagram of call dequeuing according to an embodiment of the present invention is shown. A check is made to determine if queue 43 holds a call, as in block 150. If so, IP 42 dials out to subscriber line 116, as in block 152. IP 42 may place this busy check call based on one or more event such as the arrival of any call to queue 43, filling of queue 43 with subscriber calls, passage of a fixed or variable amount of time, and the like.

Local switch 30 connected to subscriber line 116 receives the busy check call. A check is then made to determine whether subscriber line 116 is busy, as in block 154. If subscriber line 116 is busy, as in block 156, a loopback situation occurs where the Call Forward on Busy Line feature on subscriber line 116 causes the busy check call to be forwarded back to intelligent peripheral 42. In this case, IP 42 detects the loopback situation and drops the busy check call.

If subscriber line 116 is available, a queued call is connected to subscriber line 116, as in block 158. Local switch 30 begins to ring subscriber line 116. IP 42 waits for subscriber 34 to generate an off-hook signal. IP 42 may then optionally play an announcement to subscriber 34 alerting subscriber 34 that an incoming subscriber call is arriving via queue 43. IP 42 may also provide information about any additional callers in queue 43. IP 42 then connects caller 110 with subscriber 34, bridges the connection at IP host switch 40, drops the links between IP 42 and switch 40, and closes the SR-3511 connection with SCP 32.

Figure 8:
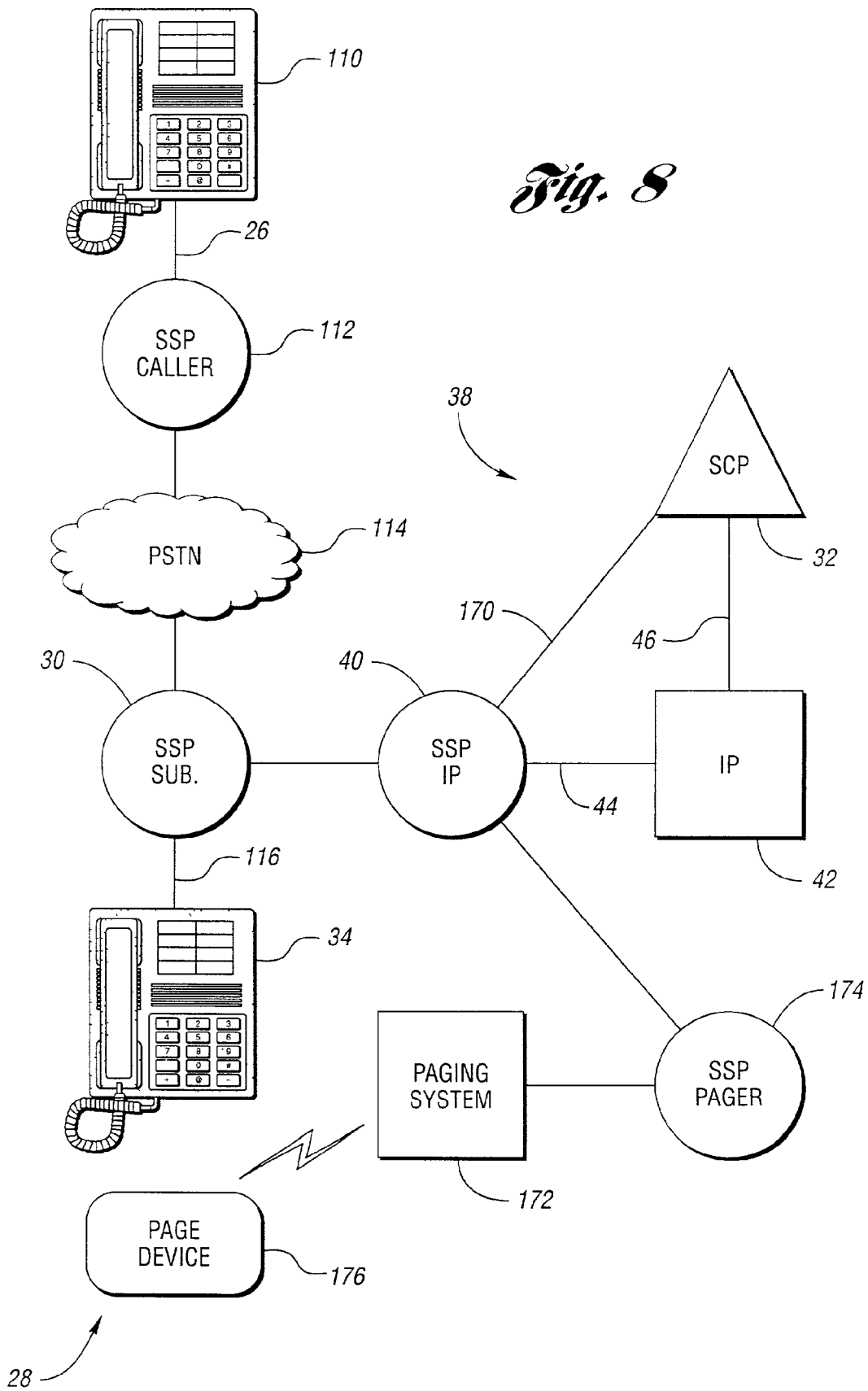
FIG. 8 is a block diagram illustrating a telecommunications-based queuing system with paging status notification capability according to an embodiment of the present invention.

Referring now to FIG. 8, a block diagram illustrating a telecommunications-based queuing system with paging status notification capability according to an embodiment of the present invention is shown. A caller, indicated by CPE device 110, accesses queuing system 28 through caller SSP 112. Caller SSP 112 is linked to other central office switches through telecommunications routing network 114. Subscriber 34 receives calls placed by caller 110 through subscriber SSP 30. Intelligent peripheral 42 queues calls placed by callers 110 when the one or more subscriber lines 116 are busy or otherwise unavailable. IP 42 is connected to callers 110 and subscribers 34 through IP SSP 40. SCP 32 communicates with switching elements in queuing system 28 through signaling connections, one of which is indicated by 170. Typically, the signaling connections pass through one or more STPs 18, not shown for clarity. In this embodiment, queuing system 28 includes paging system 172 connected to AIN network 38 through pager SSP 174. It will be recognized by one of ordinary skill in the art that SSPs 30, 40, 112, 174 are interconnected for calling information through telecommunications routing network 114 and interconnected for signaling information by a Signaling System 7 system, much of the details of which have been omitted for clarity. Further, one or more of SSPs 30, 40, 112, 174 could be implemented as a single SSP, central office, or other switching functionality.

Paging system 172 receives paging requests through SSP pager 174 and transmits paging information to a wireless page device 176. Page device 176 may be incorporated into subscriber CPE device 34, may be a standard pager, or may be a special display device capable of displaying a plurality of paged messages simultaneously. Thus, subscriber 34 can receive information about the status of calls from caller 110 queued in IP 42 through paging system 172.

Figure 9:
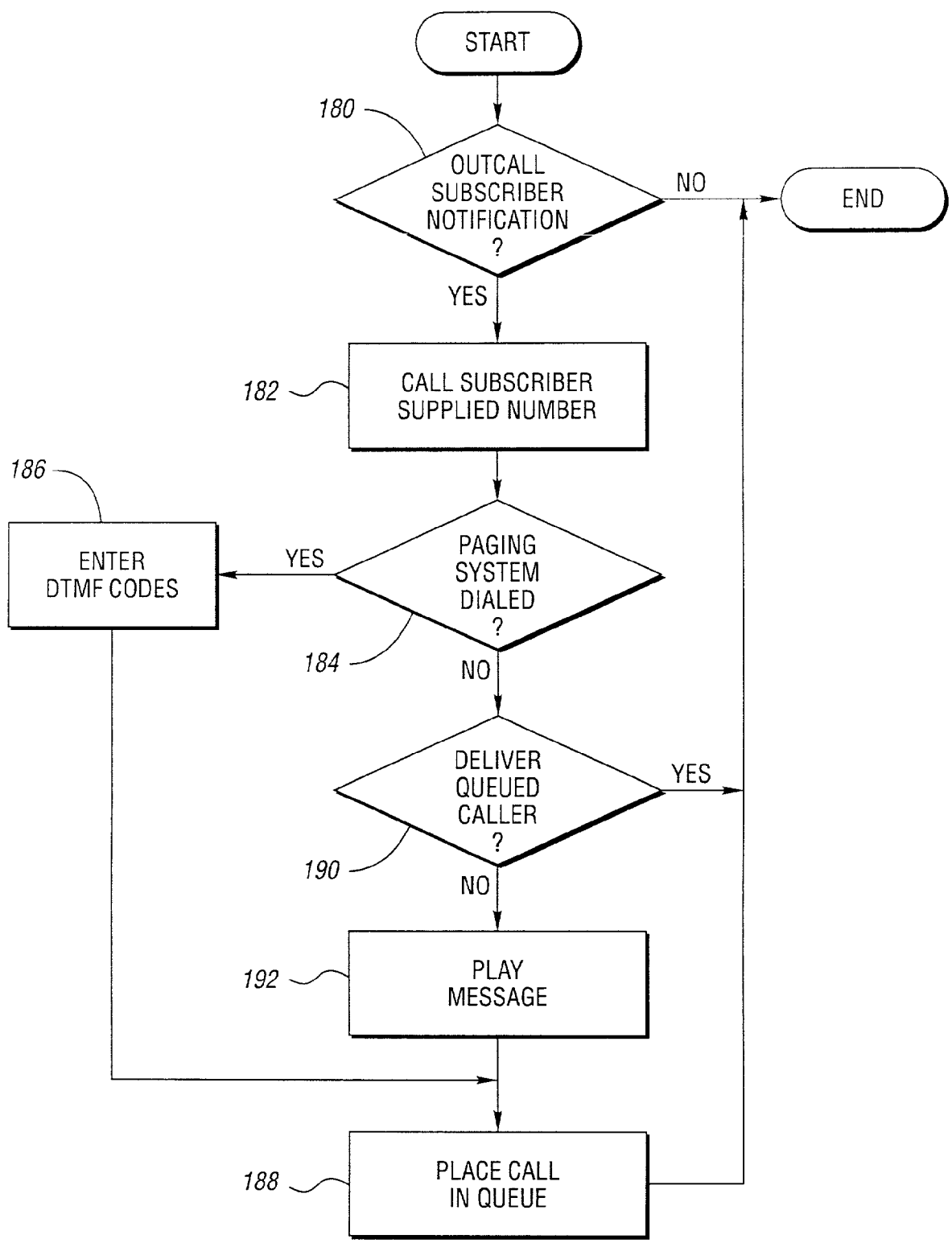
FIG. 9 is a flow diagram of queued call status notification according to an embodiment of the present invention.

Referring now to FIG. 9, a flow diagram of queued call status notification according to an embodiment of the present invention is shown. The notification method described may be implemented, for example, within block 102 of FIG. 4.

A check is made to determine if outcall subscriber notification should occur, as in block 180. This check is made at some point after a call placed by caller 110 is received by IP 42 for queuing. The method of delivery of the call to IP 42 may vary. Several types of checking are possible. For example, SCP 32 may contain service logic to determine if subscriber 34 has requested outcall notification. Also, subscriber 34 may request status information about priority handling of only certain callers 110. If caller 110 is on a prioritization list, outcall notification is triggered. If outcall notification is not triggered, the method ends.

If outcall notification is triggered, SCP 32 instructs IP 42 to out-dial a telephone number supplied by subscriber 34, as in block 182. Information about caller 110 is typically supplied in this second, separate call. For example, caller ID is provided, as available per regular caller ID privacy regulations, using the telephone number of calling party 110 and not of IP 42.

A check is made to determine if a paging system was dialed, as in block 184. When IP 42 receives answer supervision, SCP 32 follows different paths based on configuration information about subscriber 34 as to whether the number dialed is to paging system 172, to subscriber 34, or the like. If the dialed number is to paging system 172, IP 42 outpulses DTMF information, as in block 186. This information may include a personal identification code for page device 176, a special identifying sequence of digits that identifies the page as originating from the queuing service, the telephone number of calling party 110, calling name associated with caller 110, and the like. Caller 110 is then placed in queue, as in block 188. SCP 32 continues interaction with IP 42 to place caller 110 within IP queue 43.

Several options exist if the outcall from IP 42 is placed to subscriber 34, as indicated by block 190. For example, if subscriber 34 has requested immediate delivery of high priority callers 110 and caller 110 is on the high priority list, caller 110 is connected to subscriber 34 using the separate outcall line. If caller 110 is not to be immediately delivered, a message is played, as in block 192. For example, IP 42 plays an announcement to subscriber 34 that identifies caller 110 and then terminates the separate call. Caller 110 is then placed in queue, as in block 188. SCP 32 continues interaction with IP 42 to place caller 110 within IP queue 43.

As will be recognized by one of ordinary skill in the art, many options and embodiments are within the scope of the present invention. For example, if the out-dialed telephone number is not to paging system 172, subscriber 34 may refer to the caller ID display unit to determine who is being placed into queue. The subscriber may also then be given the option of providing special handling commands to preferred callers. For example, subscriber 34 may answer the IP-placed call and enter certain DTMF digits to inform queuing service 28 that calling party 110 should receive priority handling. One method of priority handling is to directly connect caller 110 to subscriber 34 on the second line dialed by IP 42. Another option is to place calling party 110 at the front of queue 43 such that the next queued call delivered to subscriber 34 is caller 110.

A variety of means to notify subscriber 34 when calls have been held in queue for an extended period of time are also possible. For example, IP 42 can call subscriber 34 or paging system 172 when caller 110 has been holding for a particular amount of time. This amount of time may be a preset number of minutes, may be varied by subscriber 24 or may be based on information about caller 110 or the status of queuing system 28. Various embodiments are possible. For example, when calling paged device 176, the numeric message sent by IP 42 may contain the number of minutes caller 110 has been holding. Also, when directly calling subscriber 34, IP 42 may include the number of minutes in queue within the caller ID display. IP 42 may also include audible notification indicating the number of minutes on hold when calling subscriber 34.

IP 42 may also place the second call once or periodically after caller 110 has been holding for longer than a threshold amount of time. The threshold amount of time may be preset, may be varied by subscriber 24 or may be based on information about caller 110 or the status of queuing system 28. For example, subscriber 34 requests notification when any caller 110 has been in queue 43 for at least five minutes. When caller 110 attempts to call subscriber 34 with all subscriber lines 116 in use, IP 42 queues caller 110 without outcall notification at that time. Then, if caller 110 has been holding for five minutes, a notification call is placed by IP 42. Calls may be placed periodically thereafter until caller 110 leaves queue 43.

Subscriber 34 may also request that IP 42 notify subscriber 34 when a certain threshold in the number of calls on hold is exceeded. In this case, IP 42 calls once or periodically when more callers 110 are in queue 43 than the threshold allows. The threshold may be preset, varied by subscriber 34, or based on one or more conditions such as information about caller 110 or the status of queuing system 28. For example, subscriber 34 may purchase five queue slots and request notification when four of the slots are filled. When a fourth caller 110 is to be queued, IP 42 places the outcall as described above. If periodic notification is requested, queuing system 28 repeatedly calls until the number of callers 110 on hold is reduced below the threshold.

The embodiment illustrated in FIG. 9 indicates that a call is queued after placing a separate call indicating status of the queued subscriber line access call. Various other embodiments are possible. For example, the call may be queued prior to placing the separate call or in parallel with placing the separate call.

Figure 10:
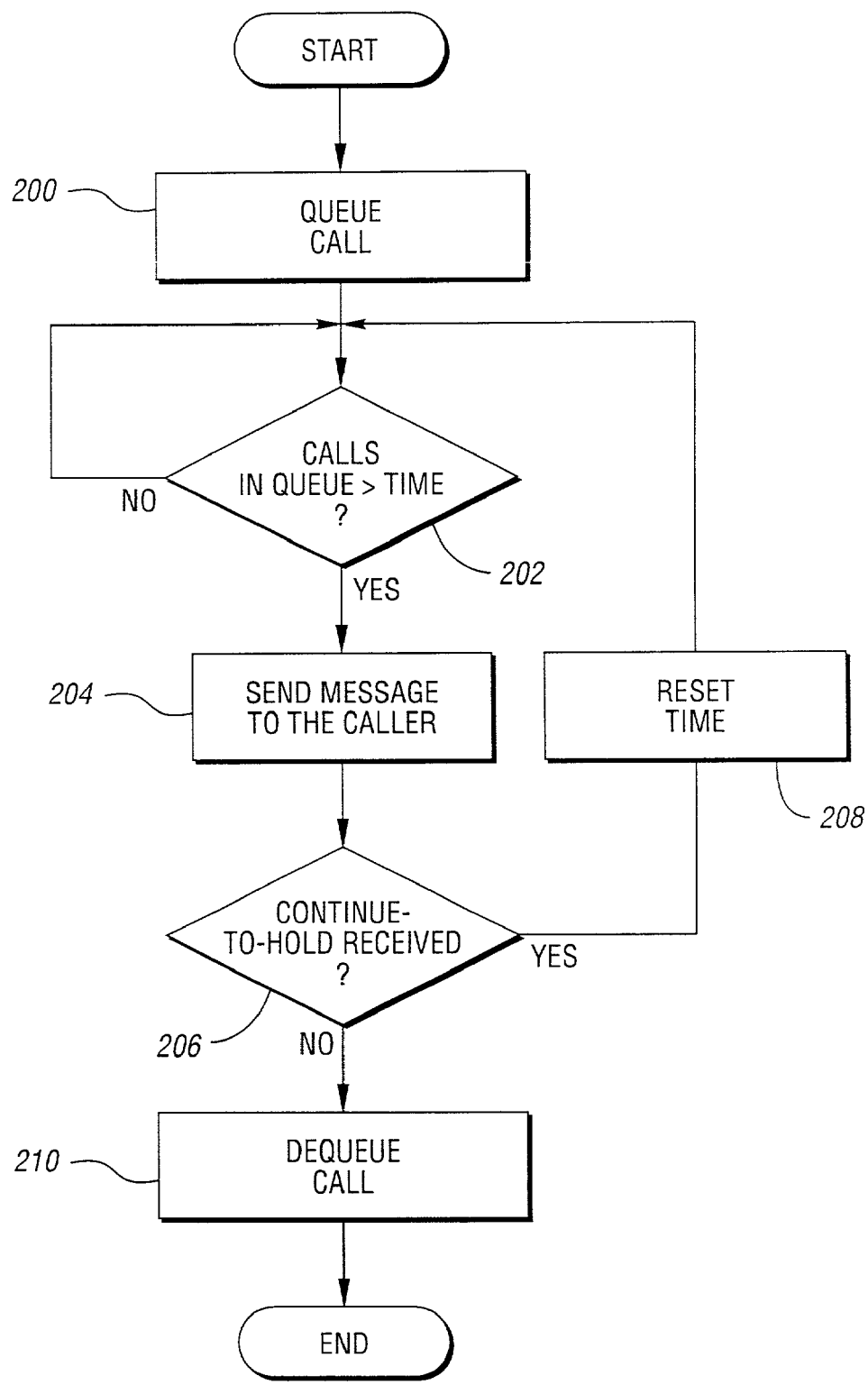
FIG. 10 is a flow diagram illustrating time-based dequeuing according to an embodiment of the present invention.

Referring to FIG. 10, a flow diagram illustrating time-based dequeuing according to an embodiment of the present invention is shown. A call is queued, as in block 200. As described above, calls destined for subscriber 24 are queued within the communications system 28. A check is made to determine if the call has been queued more than a specified time, as in block 202. This check may be made, for example, by polling the queued calls periodically to determine if any calls have exceeded the specified time. Alternatively, an interrupt may be generated in response to the expiration of time associated with a particular call. The length of time may be determined by one or more of a variety of factors. For example, the time value may be preset. The determined time may also be varied based on one or more factors such as the number of calls in the queue or the time of day. Information about the queued call may also be used to establish the wait time. For example, queued numbers recognized as being from previous callers or preferred customers may be treated differently. Also, the geographic location associated with the calling number may be used to determine the wait time.

If the call has not been serviced or the call disconnected by the determined time, a message is sent to the caller, as in block 204. Preferably, this message is an audio message asking the caller if they wish to continue holding. A check is made, as in block 206 to determine if the caller wishes to continue holding. A negative response may be determined by one or more of a variety of actions or inaction. For example, if the caller does not respond within a preset amount of time, it is assumed that the caller no longer wishes to hold. The caller may be given an option to disconnect, transfer to another line or leave a message through one or more depressions of telephone keys, a spoken response, or the like. Also, if a response other than an affirmative response is received, a negative response may be assumed. Positive responses may include one or more depressions of telephone keys, a spoken response, or the like. If an affirmative response is received, the wait time is reset, as in block 208. The check to see if wait time is exceeded, as in block 202, is then repeated. The determined wait time may also be based on one or more affirmatively received responses to the request that the caller perform an action to remain in queue.

If a negative response is received to a request to remain on hold, the call is dequeued, as in block 210. Several options for handling dequeued calls are available. First, the call could be routed to a messaging system within telecommunications network 28. As is known in the art, the messaging system may be built into intelligent peripheral 42 queuing calls for subscriber 24. The messaging system may also be built into another IP 42 or other network elements such as SSP 19, SCP 14, 32 or the like. Information such as the calling number and, if permissible, caller identification information, may be recorded automatically on the message. Thus, if a time-out occurs before the caller performs the requested action to remain in queue, a record of the call can be preserved. Another option for dequeuing the call is to simply terminate the call. Yet another option is to transfer the caller to another line. Any option may be made available for selection by the caller. The option used may be based on the type of negative response received, the caller number, load conditions, and the like.

Figure 11:
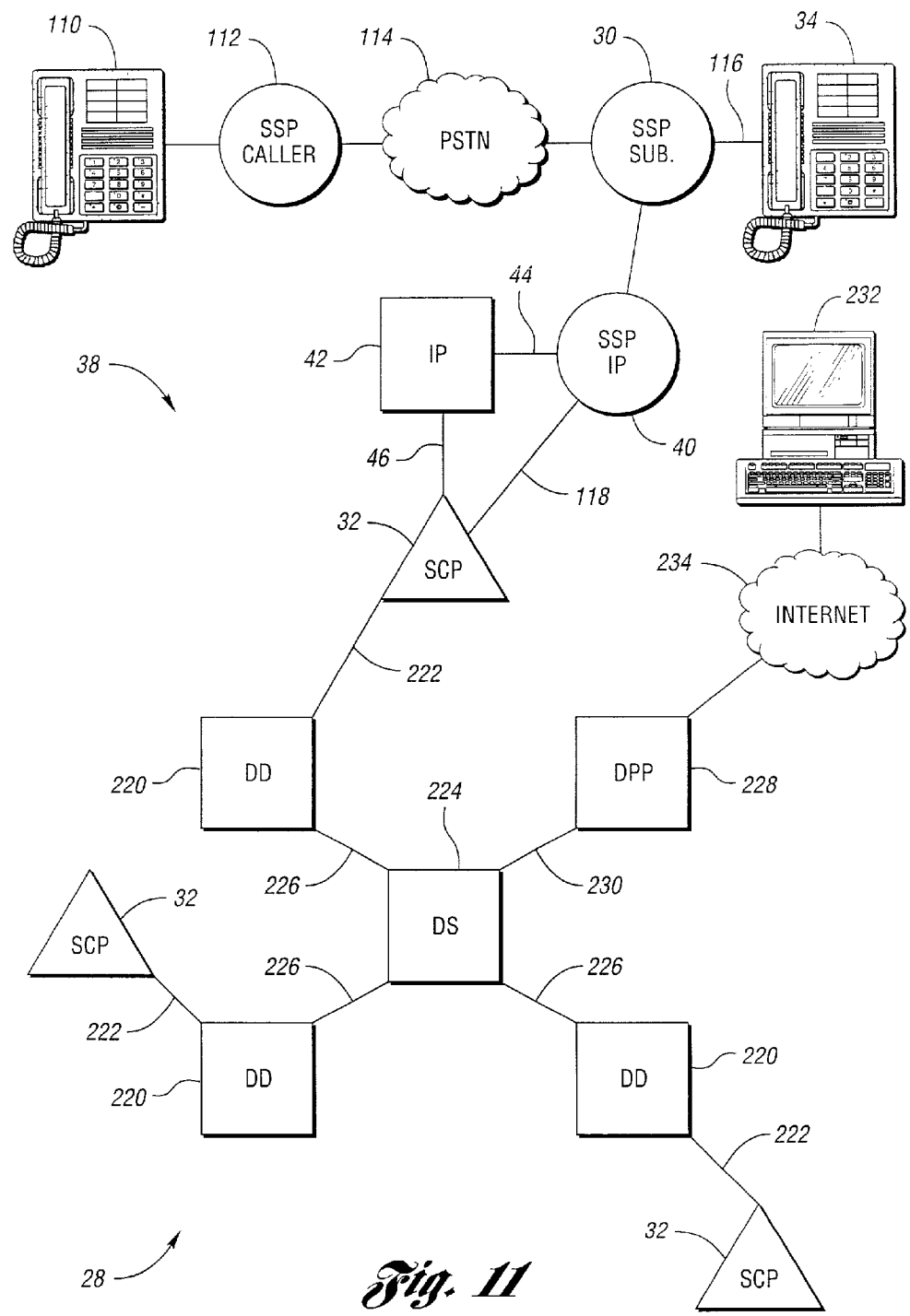
FIG. 11 is a block diagram illustrating a call queuing utilization reporting system according to an embodiment of the present invention.

Referring now to FIG. 11, a block diagram illustrating a call queuing utilization reporting system according to an embodiment of the present invention is shown. A caller, indicated by CPE device 110, accesses queuing system 28 through caller SSP 112. Caller SSP 112 is linked to other central office switches through telecommunications routing network 114. Subscriber 34 receives calls placed by caller 110 through subscriber SSP 30. Intelligent peripheral 42 queues calls placed by caller 110 when one or more subscriber lines 116 are busy or otherwise unavailable. IP 42 is connected to callers 110 and subscribers 34 through IP SSP 40. SCP 32 communicates with switching elements in queuing system 28 through signaling connections, one of which is indicated by 170. Typically, the signaling connections pass through one or more STPs 18, not shown for clarity.

It will be recognized by one of ordinary skill in the art that SSPs 30, 40, 112 are interconnected for calling information through telecommunications routing network 114 and interconnected for signaling information by a Signaling System 7 system, much of the details of which have been omitted for clarity. Further, one or more of SSPs 30, 40, 112 may be implemented as a single SSP, central office, or other switch functionality.

Each SCP 32 may service one or more IPs 42. SCP 32 collects detailed information on each call. SCP 32 maintains an open session for each call handled by IP 42 until the call is resolved, such as by connection with subscriber 34, by abandonment by caller 110, or the like.

Each SCP 32 is supported by a data distributor (DD) 220 which may be implemented, for example, with an IBM Unix-based minicomputer. SCP 32 passes raw call data, either as the data is collected or periodically, through TCP/IP link 222 to data distributor 220. A variety of data items may be collected, including total calls handled by the service, calls not placed in queue due to the service being turned off, calls not placed in queue due to all queue slots being full, calls not placed in queue due to caller abandonment, count and time on hold for calls placed in queue, count and time on hold for queued calls placed in voice mail due to caller request, count and time on hold of queued calls placed in voice mail due to no answer at the subscriber's location, count and time on hold for queued calls that resulted in voice mail for other reasons, count and time on hold for queued calls abandoned by the calling party while on hold, count and time on hold for queued calls eventually connected to the subscriber, and the like. For data where time on hold is captured, various statistics such as call duration, median, mean, standard deviation, and the like may be calculated and reported for each periodic interval.

Periodically, each data distributor 220 forwards data to data server (DS) 224. Data server 224 may be implemented, for example, as an IBM Unix-based work station connected to data distributors 220 by TCP/IP links 226.

Data server 224 aggregates data associated with each subscriber 34. Data server 224 forwards subscriber aggregated data to data publishing platform (DPP) 228. Data publishing platform 228 may be implemented, for example, as an Internet server connected to data server 224 by TCP/IP link 230. Data publishing platform 228 aggregates subscriber data across multiple report periods. Data publishing platform 228 may also calculate additional utilization statistics such as mean and median hold times for all calls placed in queue that were eventually connected to the subscriber, mean and median hold times for calls that ended up in voice mail due to caller request, mean and median hold times for calls that ended up in voice mail due to no answer at subscriber's location, mean and median hold times for calls that ended up in voice mail for other reasons, mean and median hold times for calls that were abandoned by the calling party while on hold, and the like.

Data publishing platform 228 may generate utilization reports in one or more formats to meet the needs of subscribers 34. For example, data publishing platform 228 may format utilization reports to be read by subscriber computer 232. These reports may be sent by electronic mail to subscriber computer 232. If subscriber computer 232 accesses data publishing platform 228 through an interconnecting network such as the Internet 234, they may be accessed on demand by subscriber 34 through the use of an access tool such as, for example, a web browser running on subscriber computer 232. Data publishing platform 228 may also distribute utilization reports to subscriber 34 through the mail. Such reports may be included with monthly billing reports sent to subscriber 34.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of queuing calls to a subscriber of queuing services accessed through a subscriber line, the method comprising:
   provisioning Call Forward on Busy Line on the subscriber line to permit detecting a call to the subscriber line at a local switch connected to the subscriber line;
   if the subscriber line is busy, forwarding the call to an intelligent peripheral within an Advanced Intelligent Network (AIN) telecommunications system;
   queuing the call to the subscriber in the intelligent peripheral;
   determining that the subscriber line is not busy by dialing the subscriber line from the intelligent peripheral; and
   if a call is queued in the intelligent peripheral and the subscriber line is determined to be not busy, connecting the call to the subscriber with the subscriber line.

2. A method of queuing calls as in claim 1 wherein queuing the call to the subscriber comprises forwarding the subscriber line call to a Direct Inward Dial telephone number on the intelligent peripheral.

3. A method of queuing calls as in claim 1 wherein determining that the subscriber line is not busy comprises setting a Next Event List at the subscriber local switch.

4. A method of queuing calls as in claim 1 wherein determining that the subscriber line is not busy comprises determining that the subscriber line is busy if the local switch calls the intelligent peripheral in response to the call to the subscriber line from the intelligent peripheral.

5. A method of queuing calls as in claim 1 further comprising
   determining that the call to the subscriber has been queued for a determined amount of time;
   requesting that a caller placing the call to the subscriber perform an action to remain in queue; and
   if the caller does not perform the requested action, dequeuing the call.

6. A method of queuing calls as in claim 1 further comprising:
   receiving a plurality of calls to access the subscriber line;
   placing each received call in the queue associated with the subscriber line if the subscriber line is busy;
   collecting queue utilization information about each queued call; and
   generating queue utilization statistics based on the collected queue utilization information.

7. A method of queuing calls as in claim 1 further comprising placing a call from the intelligent peripheral indicating status of the queued subscriber line call to the subscriber.

8. A method of queuing calls as in claim 1 wherein the intelligent peripheral is a switchless intelligent peripheral.

9. A system for queuing subscriber calls within an Advanced Intelligent Network (AIN) telecommunications system, each subscriber call placed by a caller to a subscriber line, the system comprising:
   a local switch servicing the subscriber line, the local switch including Call Forward on Busy Line functionality provisioned on the subscriber line, the Call Forward on Busy Line functionality forwarding any subscriber call received for the subscriber line when the subscriber line is busy; and
   an intelligent peripheral within the AIN system operative to:
      (a) receive any forwarded subscriber call from the local switch;
      (b) if queue slots are available in the intelligent peripheral, queue the received subscriber call;
      (c) place a busy check call to the subscriber line;
      (d) drop the busy check call if the busy check call is forwarded back to the intelligent peripheral from the local switch; and
      (e) connect a queued subscriber call to the busy check call if the subscriber line is not busy.

10. A system for queuing subscriber calls as in claim 9 further comprising a service control point in communication with the intelligent peripheral, the service control point determining if queue slots are available in the intelligent peripheral.

11. A system for queuing subscriber calls as in claim 10 further comprising a messaging system, the service control point instructing the intelligent peripheral to dial the number of the messaging system and to bridge the received subscriber call to the messaging system call if the service control point determines no queue slots are available.

12. A system for queuing subscriber calls as in claim 10 wherein the service control point instructs the intelligent peripheral to play a message to the received subscriber call if the service control point determines no queue slots are available.

13. A system for queuing subscriber calls as in claim 9 wherein the intelligent peripheral is further operative to request that the caller perform an action to remain in queue after determining that the subscriber call has been queued for a determined amount of time and, if the caller does not perform the requested action, to dequeue the call.

14. A system for queuing subscriber calls as in claim 9 further comprising:

a plurality of intelligent peripherals, each intelligent peripheral implementing at least one call queue, each call queue associated with one of a plurality of subscribers;

at least one service control point, each intelligent peripheral in communication with one service control point collecting information about each queued call; and a data server in communication with the at least one service control point, the data server aggregating queue utilization data for each subscriber.

15. A system for queuing subscriber calls as in claim 14 further comprising at least one data distributor, each data distributor in communication with a service control point and the data server, each data distributor receiving information about each queued call from the service control point and periodically forwarding the information to the data server.

16. A system for queuing subscriber calls as in claim 14 further comprising a data publishing platform in communication with the data server, the data publishing platform aggregating subscriber queue utilization data across a plurality of report periods.

17. A system for queuing subscriber calls as in claim 9 wherein the intelligent peripheral is further operative to place a status call providing status information to the subscriber about at least one queued call.

18. A system for queuing subscriber calls as in claim 9 wherein the intelligent peripheral is a switchless intelligent peripheral.

19. A method for queuing subscriber calls comprising:
provisioning a subscriber line with Call Forward on Busy Line functionality at a local switch servicing the subscriber line;
receiving a subscriber call destined for the subscriber line at the local switch;
if the subscriber line is busy, forwarding the received call to a Direct Inward Dial telephone number on an intelligent peripheral via the Call Forward on Busy Line functionality;
receiving the forwarded call at the intelligent peripheral; and
queuing the forwarded call at the intelligent peripheral if the intelligent peripheral has at lease one available queue slot; and
placing a call from the intelligent peripheral to determine if the subscriber line is still busy.

20. A method for queuing subscriber calls as in claim 19 further comprising calling a messaging service from the intelligent peripheral if the intelligent peripheral has no available queue slots and bridging the forwarded call with the messaging service call.

21. A method for queuing subscriber calls as in claim 19 further comprising playing a message from the intelligent peripheral if the intelligent peripheral has no available queue slots.

22. A method for queuing subscriber calls as in claim 19 further comprising playing a message from the intelligent peripheral to the forwarded call when queuing the forwarded call.

23. A method for queuing subscriber calls as in claim 19 further comprising:
determining that the subscriber call has been queued for a determined amount of time;
requesting that a caller placing the subscriber call perform an action to remain in queue; and
if the caller does not perform the requested action, dequeuing the call.

24. A method for queuing subscriber calls as in claim 19 further comprising:
receiving a plurality of subscriber calls to access the subscriber line;
placing each received call in the queue associated with the subscriber line if the subscriber line is busy;
collecting queue utilization information about each queued call; and
generating queue utilization statistics based on the collected queue utilization information.

25. A method for queuing subscriber calls as in claim 19 further comprising placing a call from the intelligent peripheral indicating status of the queued subscriber call.

26. A method for queuing subscriber calls comprising:
queuing at least one subscriber call in an intelligent peripheral;
placing a busy check call from the intelligent peripheral to a subscriber line;
receiving the busy check call in a local switch servicing the subscriber line;
if the subscriber line is busy, forwarding the busy check call back to the intelligent peripheral through Call Forward on Busy Line functionality implemented in the local switch;
disconnecting the busy check call if the intelligent peripheral receives back the forwarded busy check call; and
connecting a queued subscriber call with the busy check call if the subscriber line is not busy.

* * * * *